(12) United States Patent
Papasakellariou et al.

(10) Patent No.: US 8,417,248 B2
(45) Date of Patent: Apr. 9, 2013

(54) METHODS AND APPARATUS TO SCHEDULE UPLINK TRANSMISSIONS IN WIRELESS COMMUNICATION SYSTEMS

(75) Inventors: Aris Papasakellariou, Athens (GR); Tarik Muharemovic, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1197 days.

(21) Appl. No.: 11/838,746

(22) Filed: Aug. 14, 2007

(65) Prior Publication Data

US 2008/0039098 A1   Feb. 14, 2008

Related U.S. Application Data

(60) Provisional application No. 60/822,338, filed on Aug. 14, 2006.

(51) Int. Cl.
*H04W 36/00* (2009.01)
(52) U.S. Cl. ..... 455/442; 455/450; 455/451; 455/452.1; 455/452.2; 455/464; 455/509; 455/513
(58) Field of Classification Search ....... 455/450–452.2, 455/464, 509–512, 67.11, 67.14, 68, 69, 455/701, 702, 442, 422.1, 453
See application file for complete search history.

(56) References Cited

U.S. PATENT DOCUMENTS

| 6,510,174 | B1 * | 1/2003 | Sexton et al. | 375/213 |
|---|---|---|---|---|
| 2003/0002518 | A1 * | 1/2003 | Shibutani | 370/442 |
| 2005/0068931 | A1 * | 3/2005 | Cho et al. | 370/345 |
| 2005/0207441 | A1 * | 9/2005 | Onggosanusi et al. | 370/464 |
| 2006/0126558 | A1 * | 6/2006 | Lee et al. | 370/329 |
| 2006/0146760 | A1 * | 7/2006 | Khandekar et al. | 370/335 |
| 2006/0211426 | A1 * | 9/2006 | Costa et al. | 455/450 |
| 2007/0254598 | A1 * | 11/2007 | Bachl et al. | 455/73 |
| 2008/0232340 | A1 * | 9/2008 | Wan et al. | 370/343 |

* cited by examiner

*Primary Examiner* — Jinsong Hu
*Assistant Examiner* — Michael Nguyen
(74) *Attorney, Agent, or Firm* — Ronald O. Neerings; Wade James Brady, III; Frederick J. Telecky, Jr.

(57) ABSTRACT

Methods and apparatus to schedule uplink transmissions in wireless communication systems, such as cellular communication systems, are disclosed. A disclosed example method comprises measuring channel conditions for a plurality of equipment devices at a base transceiver station of a wireless communication system, dividing an operating bandwidth of the base transceiver station into two or more non-overlapping portions, and instructing a first of the plurality of user equipment devices to transmit a sounding reference signal in a first non-overlapping portion during a sounding reference signal transmission interval.

15 Claims, 4 Drawing Sheets

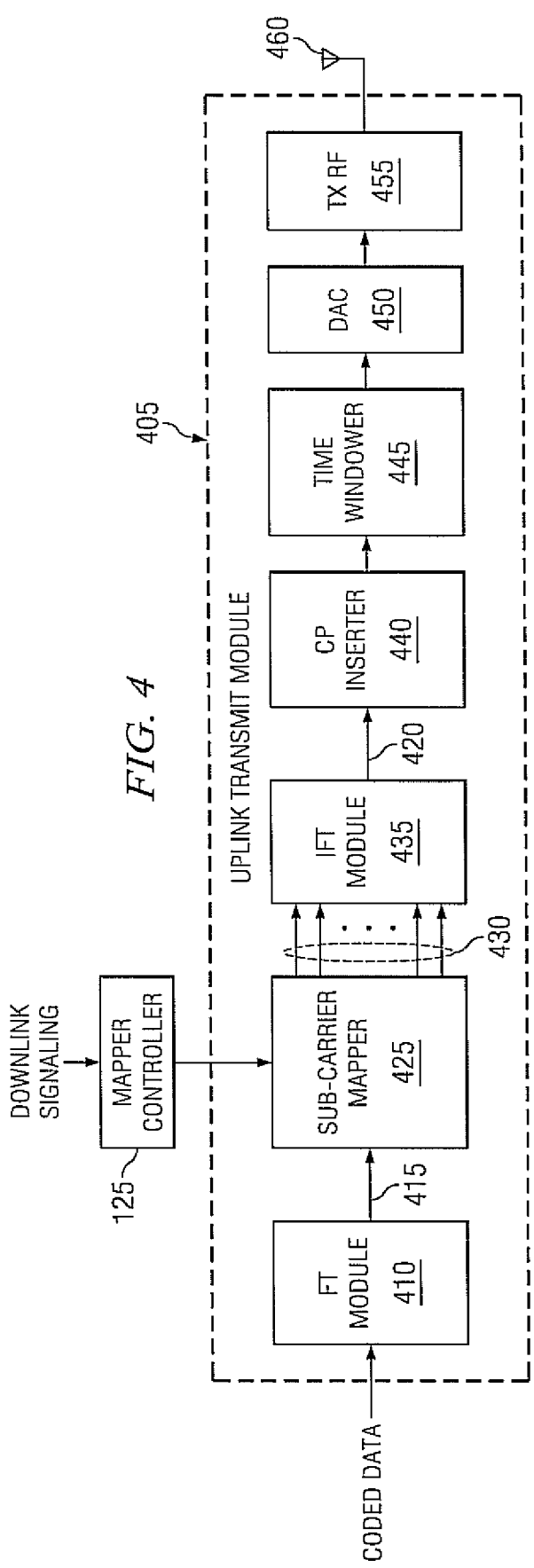
*FIG. 4*
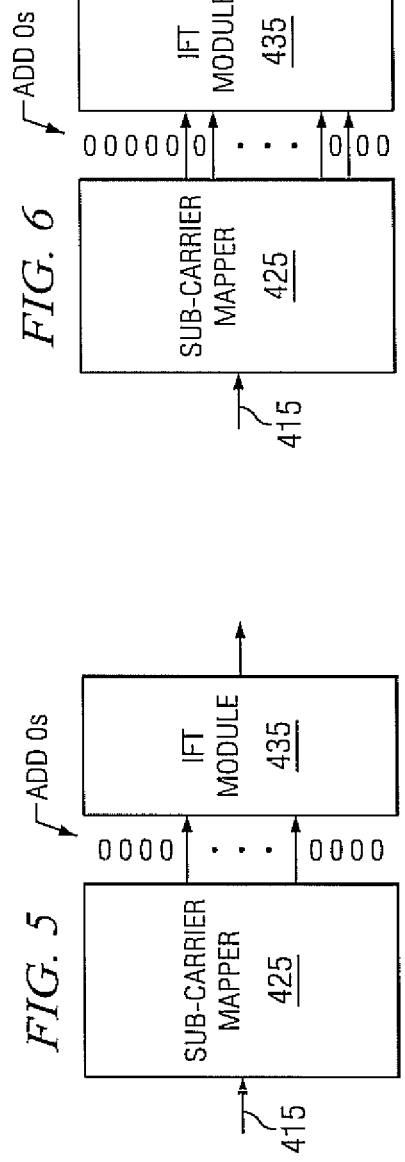
*FIG. 5*
*FIG. 6*

METHODS AND APPARATUS TO SCHEDULE UPLINK TRANSMISSIONS IN WIRELESS COMMUNICATION SYSTEMS

RELATED APPLICATIONS

This patent claims priority from U.S. Provisional Application Ser. No. 60/822,338, entitled "Scheduling Transmissions in the Uplink of Wireless Communication Systems," filed on Aug. 14, 2006, and which is hereby incorporated by reference in its entirety.

FIELD OF THE DISCLOSURE

This disclosure relates generally to wireless communication systems, and, more particularly, to methods and apparatus to schedule uplink transmissions in wireless communication systems, such as cellular communication systems.

BACKGROUND

In many wireless communication systems (e.g., a cellular communication system, a wireless local area network, etc.), a geographic area is divided into multiple wireless regions. In a cellular communication system, each cell (i.e., wireless region) is served by a fixed-location access point, which is commonly referred to in the industry as a base station, a Node B, a fixed station, and/or a cell tower. System users utilize mobile equipment to access communication services. Mobile equipment is commonly referred to the industry as user equipment (UE) devices, a mobile station (MS), and/or a mobile terminal (MT). Each cell is associated with a corresponding serving Node B. However, a Node B can serve multiple cells. To improve system performance, communication resources can be re-used across cells, where the re-use can be either "fractional re-use" or "full re-use." These resources can include frequencies, time-slots, signature codes, channels, reference signals, etc. Wireless systems, which employ re-use of communications resources based on cellular boundaries, are commonly called cellular communication systems. Transmitters and receivers can be simultaneously present in any given cell. In case of uplink and/or reverse link communication, transmitters are at UE devices, and receivers are at Node Bs. In case of downlink and/or forward link communication, transmitters are at Node Bs, and receivers are at the UE devices.

Communication between transmitters and receivers occurs via signals. A signal can be designated as either a) an information-bearing signal, or b) a reference signal. Information-bearing signals may comprise data and/or control signals. Information-bearing signals carry information from the transmitter to the receiver. In contrast, a reference signal (RS) is a signal known a priori to both the transmitter and the receiver, and is therefore totally known by the receiver prior to any detection or estimation process. As such, a reference signal can be used for estimation of the characteristics of the communication medium (channel). A reference signal is sometimes also referred to as a pilot signal and/or a training signal. Reference signals may be used for: channel estimation, channel sounding for channel quality estimation, synchronization, timing-offset estimation, frequency-offset estimation, and/or as carriers when modulated (with data or control info). Channel estimates, which are obtained from received reference signals, are used for data demodulation. Channel quality indication (CQI) measurements, which may also obtained from received reference signals, can be used for purposes of user scheduling, link adaptation, interference coordination, handover, power control, and/or other purposes.

Channel-dependent scheduling is widely known to improve throughput and/or spectral efficiency in a wireless network by having the Node B assign an appropriate modulation and coding scheme for communication from and/or to a UE, depending on channel conditions, such as the received signal-to-interference and noise ratio (SINR), the UE experiences. In addition to channel-dependent time-domain scheduling, which assigns the data transmission in a time interval the UE experiences good SINR conditions, channel-dependent frequency-domain scheduling, which assigns the data transmission in a bandwidth portion the UE experiences good SINR conditions, has been shown to provide substantial gains over purely distributed and/or randomly localized (frequency hopped) scheduling in orthogonal frequency-division multiple-access (OFDMA)-based systems.

BRIEF DESCRIPTION OF THE DRAWINGS

FIG. 4 illustrates an example manner of implementing a transmitter for any or all of the example user equipment devices of FIG. 1.

FIGS. 5 and 6 illustrate example configurations of the example sub-carrier mapper of FIG. 5.

DETAILED DESCRIPTION

Figure 1:
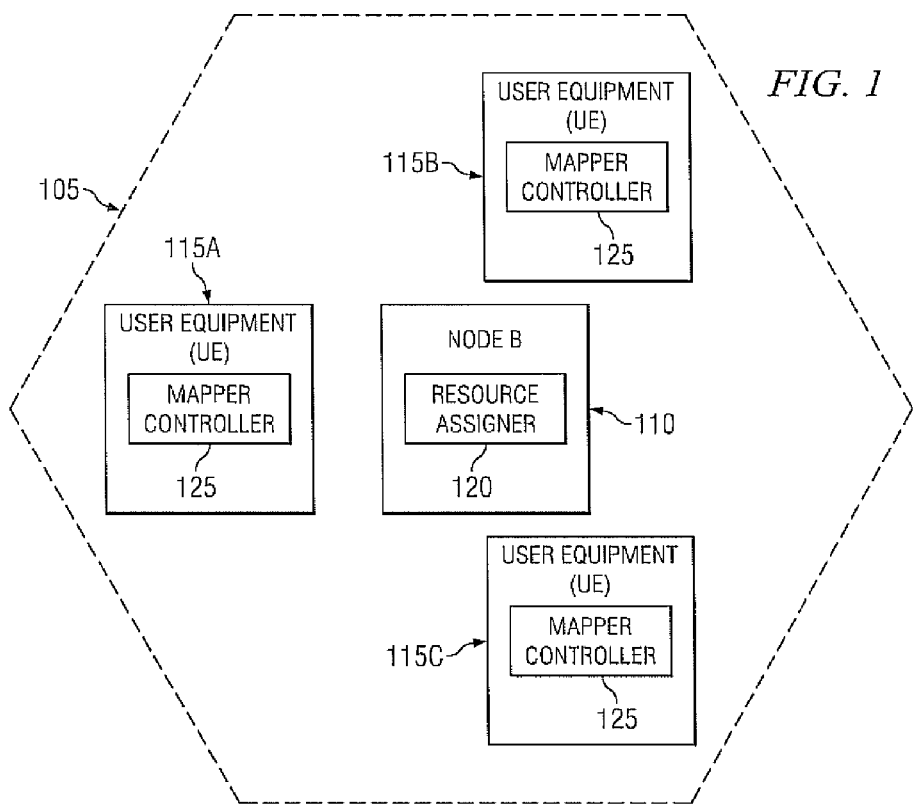
FIG. 1 is a diagram of an example wireless communication system constructed in accordance with the teachings of the invention.

FIG. 1 is a diagram of an example wireless communication system that implements frequency-domain scheduling of uplink transmissions in accordance with the teachings of the invention. The disclosed example methods and apparatus have particular applicability in orthogonal frequency division multiplexing (OFDM)-based wireless communication systems. Example OFDM-based systems include, but are not limited to: OFDM, orthogonal frequency division multiple access (OFDMA), discrete Fourier transform (DFT)-spread OFDM, DFT-spread OFDMA, single carrier (SC)-FDMA, multiple carrier (MC)-OFDM, MC-OFDMA, and others. However, it will be appreciated that the teachings of this disclosure are applicable beyond OFDM-based systems and/or cellular systems, and can be applied in other applications and/or to other transmission technologies such as, for example, wireless local area networks, mesh-networks, ad-hoc networks, and/or other wireless communication systems (e.g., CDMA and/or others).

To provide wireless data and/or communication services (e.g., telephone services, Internet services, data services, messaging services, instant messaging services, electronic mail (email) services, chat services, video services, audio services, gaming services, etc.) over a geographic area, the example wireless communication system of FIG. 1 includes any number of wireless communication cells, one of which is respectively designated in FIG. 1 with reference numeral 105. For instance, a plurality of cells could be arranged in a pattern and/or grid with abutting and/or overlapping coverage areas such that any user endpoint (UE) devices located in, and/or moving through and/or within an area communicatively covered by one or more of the plurality of cells can communicate with at least one wireless base station. To provide services, the example cell 105 of FIG. 1 includes a wireless base station (e.g., a Node B) 110. The example Node B 110 of FIG. 1 provide wireless data and/or communication services to any number and/or type(s) of mobile, fixed-location and/or substantially fixed-location UE devices currently located within the example cell 105, three of which are illustrated in FIG. 1 with reference numerals 115A, 115B and 115C. The example Node B 110 may also provide wireless data and/or communication services for one or more additional wireless cells (not shown). Example mobile UE devices 115A-C include a personal digital assistant (PDA), an MP3 player such as an iPod®, a wireless telephone (e.g., a cellular phone, a voice over Internet Protocol (VoIP) phone, a smart phone, etc.), a laptop computer with wireless communication capabilities (e.g., including a wireless modem card), etc.

The example Node B 110 and/or the example UE devices 115A-C of FIG. 1 may be, for example, implemented to modulate and transmit reference and/or data and/or control signals and/or symbols in accordance with one or more past, present and/or future wired and/or wireless communication standards and/or specifications, such as the Evolved Universal Terrestrial Radio Access (EUTRA) specification currently being defined by Third Generation Partnership Project (3GPP) Technical Study Group (TSP) Radio Access Networks (RAN) Working Group 1 (WG1). However, the wireless devices 110, 115A-C may be implemented to modulate and transmit reference and/or data and/or control signals and/or symbols in accordance with any additional and/or alternative past, present and/or future technology(-ies), standard(s) and/or specification(s) such as, for example, the Institute of Electrical and Electronics Engineers (IEEE) 802.11x family of standards, wideband code division multiple access (WCDMA), time division multiple access (TDMA), frequency division multiple access (FDMA) and/or any combination thereof.

In the illustrated example of FIG. 1, transmissions by the example UE devices 115A-C may be localized and/or distributed in the frequency-domain. As used herein, the term "localized transmission" refers to a transmission occurring within a contiguous sub-portion (e.g., within one or more contiguous resource blocks) of the operating bandwidth of the example wireless cell 105. An example resource block (RB) comprises one or more contiguous sub-carriers of a single-carrier frequency-division multiple-access (SC-FDMA) system. In some examples, localized transmissions may utilize non-contiguous RBs. As used herein, the term "distributed transmission" refers to a transmission that occurs across substantially the entire operating bandwidth of the system, either using all sub-carriers and/or a subset of the sub-carriers (e.g., every other sub-carrier).

To schedule uplink transmissions, the example Node B 110 of FIG. 1 includes a resource assigner 120, and each of the UE devices 115A-C of FIG. 1 includes a mapper controller 125. As instructed by the example resource assigner 120, the example mapper controllers 125 of FIG. 1 control the transmission of reference and/or data signals by their associated UE device 115A-C. The transmission of reference signals by the UE devices 115A-C and their subsequent reception and/or processing by the Node B 110 allows the example resource assigner 120 of FIG. 1 to measure channel conditions between the UE devices 115A-C and the Node B 110. Example channel condition measurements are the uplink channel quality indicator (CQI) estimated by a Node B. Based on the CQI estimates, the example resource assigner 110 performs frequency-domain channel-dependent scheduling.

In order for the example Node B 110 to obtain a CQI estimate for the particular uplink channel affecting a signal transmitted by a given UE device 115A-C over a scheduling bandwidth and, thus, be able to perform frequency-domain channel-dependent scheduling, the UE device 115A-C transmits a reference signal (RS) over the scheduling bandwidth (e.g., a reference signal multiplexing block (RSMB)) and/or over the entire operating bandwidth. A distributed and/or wideband RS facilitates estimation of CQI values by channel sounding and is therefore referred to herein as a "sounding RS" (SRS) and/or "CQI RS". On the other hand, in order to reduce (e.g., minimize) performance losses from inaccurate channel estimates, a UE device 115A-C transmits the RS used for coherent data demodulation (DM RS) only over the RBs where the UE device 115A-C is scheduled to transmit data and/or control signals, thereby concentrating the transmit power of the DM RS only over the bandwidth portion of data and/or control signal transmission. In the example wireless communication system of FIG. 1, reference signals (e.g., SRS and/or DM RS) are chosen to partially or wholly satisfy the CAZAC property. That is, they are chosen to have a substantially constant amplitude (CA) (i.e., they all have substantially the same magnitude) and to have substantially zero cyclic autocorrelation (ZAC) (e.g., a cyclically shifted version of a signal S has substantially zero correlation with the signal S itself). Example signals that partially or wholly satisfy the CAZAC property include, but are not limited to, the family of Chu and Frank-Zadoff sequences (i.e., Zadoff-Chu sequences), generalized chirp-like (GCL) sequences, and Kasumi sequences. For example, the formula cited on page 53 from K. Fazel and S. Keiser, "Multi Carrier and Spread Spectrum Systems," John Wiley and Sons, 2003 may be used to generate reference signals, and is reproduced below in EQN (1) for ease of reference (the Fazel and Keiser book is hereby incorporated herein by reference). In particular, the k-th element of the n-th Zadoff-Chu CAZAC sequence (i.e., Sn, where n=1, 2, ... N) can be computed as:

$$Sn(k) = \exp\left[j2\pi n \frac{k(k+1)/2 + qk}{L}\right] \quad \text{for } L \text{ odd} \qquad \text{EQN (1)}$$

$$Sn(k) = \exp\left[j2\pi n \frac{k^2/2 + qk}{L}\right] \quad \text{for } L \text{ even,}$$

where q is any integer, L is any positive integer, and n is any number which is relatively prime with L. However, any other type(s) of CAZAC and/or pseudo-CAZAC sequences (i.e., signals) may be used, including CAZAC sequences generated by a computer search for sequences satisfying the CAZAC properties and possibly satisfying additional properties mentioned below. Also, any number of additional sequences may be generated from a set of CAZAC sequences by, for example, any of the following operations: multiplication by a constant, discrete Fourier Transform (DFT), Inverse DFT, cyclic shift, block repetition, sequence truncation, and/or any combination thereof. Moreover, reference signals may be chosen in accordance with any alternative and/or additional criteria and/or properties (e.g., auto and/or cross-correlation properties, time and/or frequency properties, amplitude properties, etc.).

Figure 2:
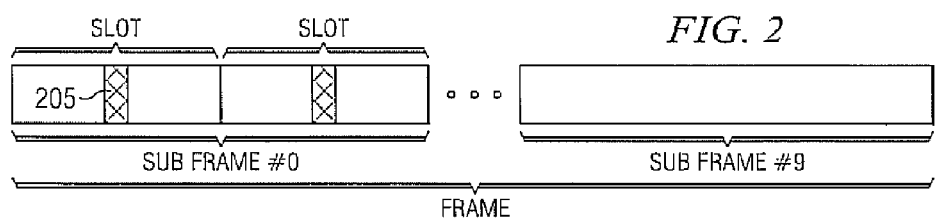
FIG. 2 illustrates an example transmission frame format that may be transmitted by any or all of the example wireless base stations and/or the example user equipment of FIG. 1.

Per the current working assumptions of the EUTRA wireless standard committee, FIG. 2 illustrates an example partitioning of time into units of system frames (each 10 milliseconds (msec) in duration), which are further divided into ten sub-frames (each 1 msec in duration). As illustrated, sub-frames are further divided into two slots (each 0.5 msec in duration). Each slot comprises one or more SC-FDMA symbols; for example, a slot may comprise of seven SC-FDMA symbols (not shown). In the illustrated example of FIG. 2, one reference signal (RS) 205 is transmitted during the middle symbol of each slot. The remainder of each slot is divided into six additional time intervals (symbols) that are reserved for uplink data and possibly control transmission. One of these six time intervals per slot can be assigned to sounding RS transmissions, with some further restrictions being possible. While a particular frame structure is illustrated in FIG. 2, time may be partition into any other units, frames, sub-frames and/or slots.

In general, there are two significant limitations in traditional uplink scheduling methods that make frequency-dependent scheduling more difficult than in the downlink. First, the example UE devices 115A-C are transmit power limited which makes accurate CQI estimation difficult, particularly for UE devices 115A-C located near the geographic boundary of the cell 105 and/or whose signals are received at the Node B 110 with low signal-to-interference and noise ratio (SINR). Also, unlike the downlink where the CQI estimate may be averaged over several sub-frames, in the uplink this is only possible if the UE device 115A-C transmits an SRS during consecutive sub-frames, which would result in an unacceptable increase in uplink overhead, as the SRS typically occupies a SC-FDMA symbol that could be otherwise allocated for data transmission. Second, each of multiple UE devices 115A-C need to be able to transmit a separate SRS for CQI measurements, making the efficient multiplexing of such reference signals an important issue. For the example wireless cell 105 to operate most efficiently, the overhead associated with the transmission SRSs should be less the resulting scheduling gains in uplink throughput.

Figure 3:
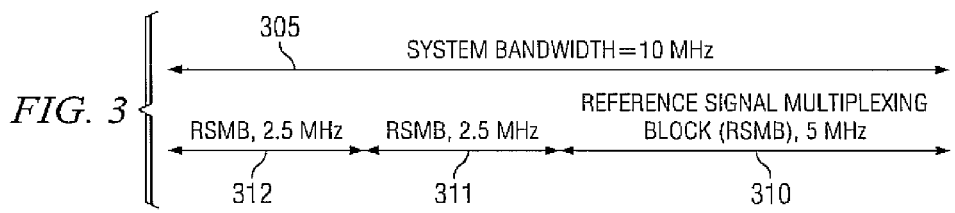
FIG. 3 illustrates an example allocation of system bandwidth for the example wireless communication system of FIG. 1.

To obviate the limitations of traditional uplink scheduling methods, the example resource assigner 120 of FIG. 1 partitions the operating bandwidth of the example wireless cell 105 into two or more non-overlapping portions, referred to herein as reference signal multiplexing blocks (RSMBs). RSMBs may be of the same and/or different sizes. In some examples, each RSMB represents a contiguous set of RBs. For example as illustrated in FIG. 3, a system bandwidth 305 of 10 million cycles per second (MHz) is split into three RSMBs 310, 311 and 312. The example RSMB 310 has a bandwidth of 5 MHz, and the RSMBs 311 and 312 have bandwidths of 2.5 MHz. In another example especially applicable to a wireless communication cell 105 having a large proportion of its UE devices 115A-C near the boundaries of the cell 105, the 10 MHz system bandwidth 305 is subdivided into 4 RSMBs of 1.25 MHz and 2 RSMBs of 2.5 MHz. The effective SINR of a SRS transmitted over 1.25 MHz is improved by 9 decibels (dB) relative to a SRS transmitted over the entire 10 MHz system bandwidth 305, for the same UE device transmit power, leading to improved CQI estimation accuracy. The size(s) and/or numbers of RSMBs may be changed (e.g., adapted) as channel conditions and/or geographic distribution of UE devices 115A-C changes.

Returning to FIG. 1, RSMBs allow the example resource assigner 120 to facilitate the multiplexing of the SRS transmissions for groups of UE devices 115A-C having similar channel conditions. The example resource assigner 120 chooses the width of the RSMBs to improve (e.g., maximize) frequency-dependent scheduling gains. In general, the minimum RSMB size is chosen such that frequency-dependent (and/or time-dependent) scheduling can be enabled for all UE devices 115A-C located within a cell area 105. The minimum RSMB size and the RSMB multiplexing may be configurable and/or adaptable to address the varying distribution of the channel conditions and varying number for the various UE devices 115A-C in a cell 105. For example, wide RSMBs are applicable to higher data rate UE devices 115A-C and/or UE devices 115A-C in good channel conditions, while narrow RSMBs are applicable to support many lower data rate UE devices 115A-C and/or UE devices 115A-C in poor channel conditions. The example resource manager 120 of FIG. 1 adaptively partitions the overall system bandwidth based on the channel conditions of the UE devices 115A-C and can, additionally or alternatively, tradeoff increases in scheduling gains against decreased CQI estimation quality by adjusting the size of the RSMBs. The larger the bandwidth of a particular RSMB, the larger the scheduling gains that can be achieved but the poorer the CQI accuracy as the transmitted signal power is spread over a wider bandwidth and the fewer the number of UE devices that can transmit SRS for a given operating bandwidth and SRS overhead.

As described more fully below in connection with FIGS. 7 and 8, based on CQI estimates for one or more UE devices 115A-C of the Node B 110, the example resource manager 120 of FIG. 1 determines and/or adjusts the number of RSMBs and the size of each RSMB. The example resource manager 120 also assigns each of the UE devices 115A-C to a particular RSMB based on their associated CQI estimate. The example resource manager 120 assigns UE devices 115A-C having good wideband SINRs, and therefore associated CQI estimates with good quality, to larger RSMBs. As such, the UE devices 115A-C use more broadly distributed SRSs to sound larger bandwidths thereby allowing the Node B 110 to achieve larger scheduling gains. Likewise, UE devices 115A-C having poor wideband SINRs, and therefore associated CQI estimates with poor quality, are assigned to smaller RSMBs to facilitate more accurate CQI estimations (since they will then transmit SRSs across a narrower bandwidth resulting in increased power per sub-carrier which translates to improved SINR). The Node B 110 may schedule data transmissions for a given UE device 115A-C within its assigned RSMB. As described below, the example resource assigner 120 may schedule sounding reference signal transmission for a UE device 115A-C within its assigned RSMB and/or within one or more additional RSMBs.

Because the example operating bandwidth of the example Node B 110 of FIG. 1 has been split into multiple non-overlapping RSMBs, the Node B 110 can support a larger number of concurrent SRSs while avoiding the need for simultaneous SRS transmissions at different frequencies, thereby reducing any peak-to-average power ratio (PAPR) increases and/or maintaining the single-carrier property of the transmissions. Non-overlapping RSMBs also simplify the allocation of SRSs to different UE devices 115A-C since the number of SRSs in a SC-FDMA system is the same regardless of the scheduling bandwidth size. Therefore, by subdividing the operating bandwidth into non-overlapping RSMBs, the number of available SRSs is multiplied by the number of RSMBs, as the different UEs can simultaneously transmit their SRS in correspondingly different RSMBs during the same SRS transmission period (e.g., SC-FDMA symbol).

Restricting the scheduling of uplink transmissions of UE devices 115A-C to their assigned RSMB need not imply scheduling diversity losses for cell-interior UE devices 115A-C (e.g., having good channel conditions). UE devices 115A-C in good channel conditions (large wideband SINR) may be assigned to wide RSMBs offering significant frequency-domain scheduling gains while maintaining good reliability for the CQI estimate. Moreover, the example resource assigner 120 of FIG. 1 may multiplex SRSs across RSMB boundaries during certain SRS transmission time intervals while keeping the multiplexing within the RSMB boundaries during other SRS transmission time intervals. This allows UE devices 115A-C in good channel conditions to be instructed by the Node B 110 to probe the entire system bandwidth available for scheduling (e.g., the example system bandwidth 305 of FIG. 3) and not just the bandwidth of a particular RSMB. Additionally or alternatively, the example resource assigner 120 may periodically reassign a UE device 115A-C to a different RSMB based on the CQI measurements of the UE device 115A-C in the currently assigned and the newly assigned RSMB. This reassignment of UE devices 115A-C to RSMBs has low signaling and/or overhead requirements as it is caused by long-term changes in the channel conditions, such as path loss and shadowing, which occur at a much slower rate than the sub-frame rate.

The example Node B 110 of FIG. 1 instructs the UE devices 115A-C through downlink control signaling (through the physical and/or media access control (MAC) layers, also referred to as L1/L2 control, and/or through higher layers) when to transmit, in which RSMB(s) an SRS transmission should occur, and which SRS (out of a number of available SRS) the UE should use for channel probing. The assignment of the above SRS transmission parameters can be such that it achieves orthogonal SRS multiplexing and/or reduces collisions among assigned SRSs in either RSMB. For periodic SRS transmissions from a UE, this assignment needs only occur once at the initial configuration of the SRS transmission parameters.

By controlling where (e.g., in which RSMB(s)) and when (e.g., in which particular slot(s) and/or sub-frames)) a UE device 115A-C transmits an SRS, the example resource assigner 120 can continually monitor the channel conditions of its UE devices 115A-C across the entire operating bandwidth of the Node B 110. To allow a first UE device 115A-C assigned to a first RSMB to probe a second RSMB, the resource assigner 120 may instruct a second UE device 115A-C assigned to the second RSMB to not transmit an SRS during a particular sub-frame thereby allowing the first UE device 115A-C to transmit the SRS. Moreover, the resource assigner 120 can instruct a UE device 115A-C to transmit a distributed SRS in some sub-frames and transmit a DM RS in other sub-frames. Further, a UE device 115A-C having a scheduled uplink transmission in an RSMB may be instructed to not transmit an SRS during a sub-frame in the RSMB where the UE device 115A-C has its uplink data transmission scheduled, and may further be instructed to transmit an SRS in another RSMB. Further still, a UE device 115A-C may be instructed to transmit an SRS in its assigned RSMB and/or in other RSMBs during sub-frames where the UE device 115A-C does not have an uplink data transmission. Further yet, a UE device 115A-C having an uplink transmission in an RSMB, may be instructed to transmit a SRS in several sub-frames, regardless of whether the UE device 115A-C has additional uplink data transmissions, in order to allow for improved CQI estimation. From these and other readily apparent examples, persons of ordinary skill in the art will readily appreciate that the example resource assigner 120 of FIG. 1 may control and/or instruct the UE devices 115A-C to transmit reference signals (SRS, CQI RS, DM RS and/or otherwise) during sub-frames and RSMBs in any combination to achieve any number of channel probing, RSMB adaptation and/or to achieve channel-dependent scheduling gains.

In cases where a desired RSMB partitioning may create conflicts, frequency hopping across and/or within RSMBs may be performed to exploit frequency diversity. For example, if very few UE devices 115A-C have poor channel conditions, it may be preferable to avoid configuring a small RSMB in order to improve the frequency scheduling gains for the majority of UE devices 115A-C. Since the UE device(s) 115A-C experiencing poor channel conditions cannot provide a reliable CQI estimate in active RSMBs, scheduling may occur through random frequency hopping within RBs of a RSMB and/or across RSMBs. In such cases, scheduling of these UE devices 115A-C may be performed, if possible, during sub-frames where all UE devices 115A-C have a localized DM RS transmission to optimize channel estimation performance since a reliable CQI estimate within the channel coherence period may not be possible to obtain.

FIG. 4 illustrates an example manner of implementing an uplink transmit module 405 for any or all of the example UE devices 115A-C of FIG. 1. The example uplink transmit module 405 of FIG. 4 is controlled by the example mapper controller 125 of FIG. 1 to transmit reference and/or data signals within different RBs and/or RSMBs. As described above, the example mapper controller 125 receives instructions (e.g., from the example Node B 110 and/or the example resource assigner 120 via downlink control signaling) regarding whether, when and/or where to transmit reference and/or data signals.

To compute a Fourier transform (e.g., using a DFT) of coded data to be transmitted, the example uplink transmit module 405 of FIG. 4 includes any type of Fourier transform (FT) module 410. The example FT module 410 computes a DFT of a vector of the coded data to form a frequency-domain representation 415 of the coded data. In addition to coded data, the uplink transmit module 405 of FIG. 4 can be used for SRS and/or DM RS transmission by including, for example, a time-domain cyclic shift (e.g., as it was previously mentioned for a CAZAC sequence), and, particularly in the case of SRS, repetition of the signal in the time-domain prior to the FT module 410 to create a comb spectrum in the frequency-domain.

To map the frequency-domain representation 415 into particular sub-carriers (e.g., frequencies) of a modulated signal 420, the example uplink transmit module 405 of FIG. 4 includes a sub-carrier mapper 425. As directed by the example mapper controller 125 and using any of number and/or type(s) of algorithm(s), method(s), logic(s) and/or based upon the type of modulation performed by the example uplink transmit module 405 (e.g., OFDM, DFT-spread OFDM, and/or single-carrier OFDM), the example sub-carrier mapper 425 of FIG. 4 maps the values of the frequency-domain vector 415 into particular inputs 430 of an Inverse Fourier Transform (IFT) module 435. As described below in connection with FIGS. 5 and 6, the example sub-carrier mapper 425 can map the frequency-domain representation 410 into a set of inputs 430 (e.g., to generated localized and/or distributed transmissions within one or more RBs and/or RSMBs).

To compute the modulated signal 420, the example uplink transmit module 405 of FIG. 4 includes any type of IFT module 435. The example IFT module 435 of FIG. 4 computes an IFT (e.g., using an inverse fast Fourier transform (IFFT)) of the inputs 430 to form a time-domain signal vector 420. The resulting time-domain signal vector 420 is prepended with a cyclic-prefix (CP) by a CP inserter 440, time windowed to produce a signal with the desired spectral characteristics by a time windower 445, and converted to the analog domain using a digital-to-analog converter (DAC) 450. The resulting analog signal is then filtered, up-converted to a carrier frequency suitable for transmission as an RF signal by a transmit RF module 455, and then transmitted via an antenna 460.

While an example manner of implementing an uplink transmit module 405 for any or all of the example UE devices 115A-C of FIG. 1 is illustrated in FIG. 4, the uplink transmit module 405 may be implemented using any number and/or type(s) of alternative and/or additional processors, devices, components, circuits, modules, interfaces, etc. Further, one or more of the processors, devices, components, circuits, modules, elements, interfaces, etc. illustrated in FIG. 4 may be combined, re-arranged, eliminated and/or implemented in any other way. Additionally, the example mapper controller 125, the example FT module 410, the example sub-carrier mapper 425, the example IFT module 435, the example CP inserter 440, the example time windower 445 and/or, more generally, the example uplink transmit module 405 may be implemented as any combination of firmware, software, logic and/or hardware. Moreover, the example uplink transmit module 405 may include processors, devices, components, circuits, interfaces and/or modules instead of and/or in addition to those illustrated in FIG. 4, and/or may include more than one of any or all of the illustrated processors, devices, components, circuits, interfaces and/or modules.

FIGS. 5 and 6 illustrate example configurations of the example sub-carrier mapper 425 of FIG. 1. In the illustrated example of FIG. 5, the example sub-carrier mapper 425 maps the frequency-domain values 415 into a contiguous set of inputs (i.e., sub-carriers) associated with one or more RBs and/or RSMBs. The other inputs of the IFT module 435 are zero.

In the illustrated example of FIG. 6, the example sub-carrier mapper 425 maps the frequency-domain values 415 into an interspersed set of inputs (i.e., sub-carriers) associated with one or more RBs and/or RSMBs. For example, the values 415 may be mapped to every other sub-carrier within an RSMB (and/or set of RSMBs), with the alternative values being zero. Additional inputs corresponding to unused RSMBs are also zero.

Figure 7:
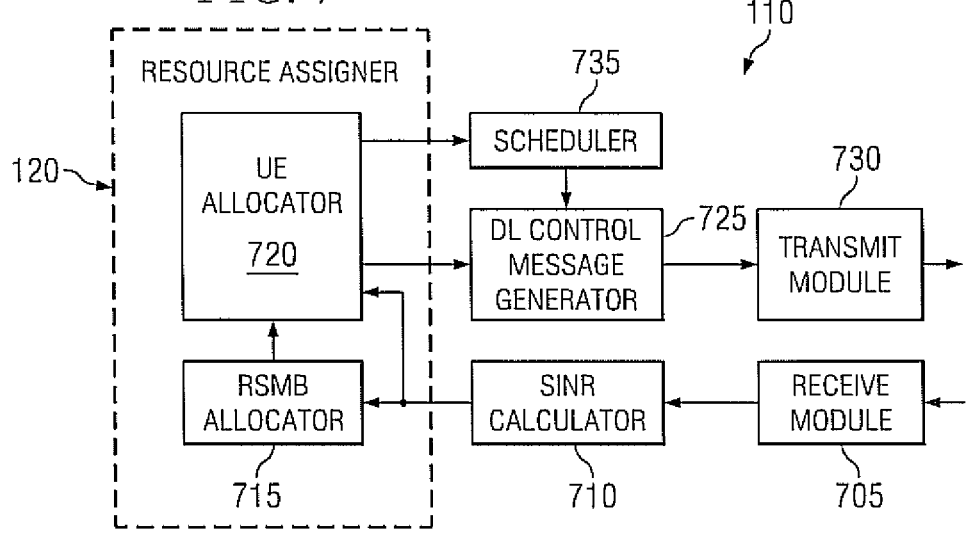
FIG. 7 illustrates an example manner of implementing the example resource manager of FIG. 1.

FIG. 7 illustrates an example manner of implementing the example resource assigner 120 and/or, more generally, the example Node B 110 of FIG. 1. To receive signals, the example device 110 of FIG. 7 includes a wireless receive module 705. The example wireless receive module 705 of FIG. 7 receives uplink RF signals from UE devices via an antenna, down-converts the received RF signals to baseband, applies one or more filters, converts the filtered analog signal to the digital domain, and applies applicable demodulation and/or decoding.

To compute (e.g., estimate) channel conditions for UE devices (e.g., the example UE devices 115A-C of FIG. 1), the example device 110 of FIG. 7 includes an SINR calculator 710. Using any of number and/or type(s) of algorithm(s), method(s) and/or logic(s), the example SINR calculator 710 of FIG. 7 estimates SINR value(s) and/or CQI value(s) for the UE device(s) based on received SRS(s).

To choose RSMBs, the example resource assigner 120 of FIG. 7 includes an RSMB allocator 715. Based on the channel conditions (e.g., SINR and/or other CQI value(s)) for the UE device(s) associated with the example resource assigner 120, the example RSMB allocator 715 of FIG. 7 determines the number and/or sizes of RSMBs into which the overall operating bandwidth should be split. The example RSMB allocator 715 assigns each UE device to a channel condition group based on its SINR. For example, UE devices having SINR values within a first range are assigned to a first channel condition group, and those having SINR values within a second range are assigned to a second channel condition group. The first and second ranges correspond to particular RSMB bandwidths (e.g., 1.25 MHz, 2.5 MHz, 5 MHz, etc.) that are suitable for UE devices having SINR values within those ranges. The number of each bandwidth RSMB is then selected based on the relative sizes of the channel condition groups and, as previously mentioned, it may vary during different SRS transmission time instances. For example, if there are twice as many UE devices assigned to channel condition group #1 than to channel condition group #2, then there will be twice as many RSMBs having a bandwidth corresponding to channel condition group #1 than to channel condition group #2. However, a sum of the RSMB bandwidths cannot exceed the overall system operating bandwidth. As SINR values are updated by the SINR calculator 710, the example RSMB allocator 715 determines when the number and/or size of RSMBs should be adjusted to improve the overall performance of the wireless communication system.

To assign UE devices to RSMBs, the example resource assigner 120 of FIG. 7 includes a UE allocator 720. For each sounding reference signal transmission interval, the example UE allocator 720 of FIG. 7 determines which UE device should transmit which SRS in which RSMB. For example, the UE allocator 720 may periodically and/or aperiodically instruct each UE device of an RSMB to transmit an SRS so that its CQI estimate may be updated. The example UE allocator 720 may also periodically and/or aperiodically instruct a UE device to transmit an SRS in another RSMB to maintain a CQI estimate for the overall operating bandwidth.

To send SRS, SRS transmission interval and/or RSMB assignments to the UE devices, the example device 110 of FIG. 7 includes a downlink (DL) control message generator. Using any number and/or type(s) of protocols(s), messages(s) and/or frames(s), the example DL control message generator 725 of FIG. 7 sends the SRS transmission interval and/or RSMB assignments to the UE devices via downlink control signaling via the physical and/or media access control (MAC) layers of a transmit module 730 (also referred to as L1/L2 control) and/or through higher protocol stack layers.

To transmit signals, the example device 110 of FIG. 7 includes a wireless transmit module 730. The example wireless transmit module 730 of FIG. 7 encodes and/or modulates data to be transmitted, converts the modulated signal to the analog domain, applies one or more filters, up-converts the filtered signal to an RF signal, and transmits the RF signal via an antenna.

To schedule uplink data transmissions, the example device 110 of FIG. 7 includes a scheduler 735. Using any number and/or type(s) of algorithm(s), method(s) and/or logic(s), the example scheduler 735 of FIG. 7 performs frequency and/or time channel-dependent scheduling of UE devices within the RSMBs allocated by the RSMB allocator. Such scheduling is based on the assignments of UE devices to RSMBs by the UE allocator. Uplink data transmission assignments are transmitted to the UE devices via the DL control message generator 725.

While an example manner of implementing the example resource assigner 120 and/or, more generally, the example Node B 110 of FIG. 1 are illustrated in FIG. 7, the Node B 110 and/or the resource assigner 120 may be implemented using any number and/or type(s) of alternative and/or additional processors, devices, components, circuits, modules, interfaces, etc. Further, one or more of the processors, devices, components, circuits, modules, elements, interfaces, etc. illustrated in FIG. 7 may be combined, re-arranged, eliminated and/or implemented in any other way. Additionally, the example receive module 705, the example SINR calculator 710, the example RSMB allocator 715, the example UE allocator 720, the example DL control message generator 725, the example transmit module 730, the example scheduler 735 and/or, more generally, the example Node B 110 or the resource assigner 120 may be implemented as any combination of firmware, software, logic and/or hardware. Moreover, the example Node B 110 and/or the resource assigner 120 may include processors, devices, components, circuits, interfaces and/or modules instead of and/or in addition to those illustrated in FIG. 7, and/or may include more than one of any or all of the illustrated processors, devices, components, circuits, interfaces and/or modules.

Figure 8:
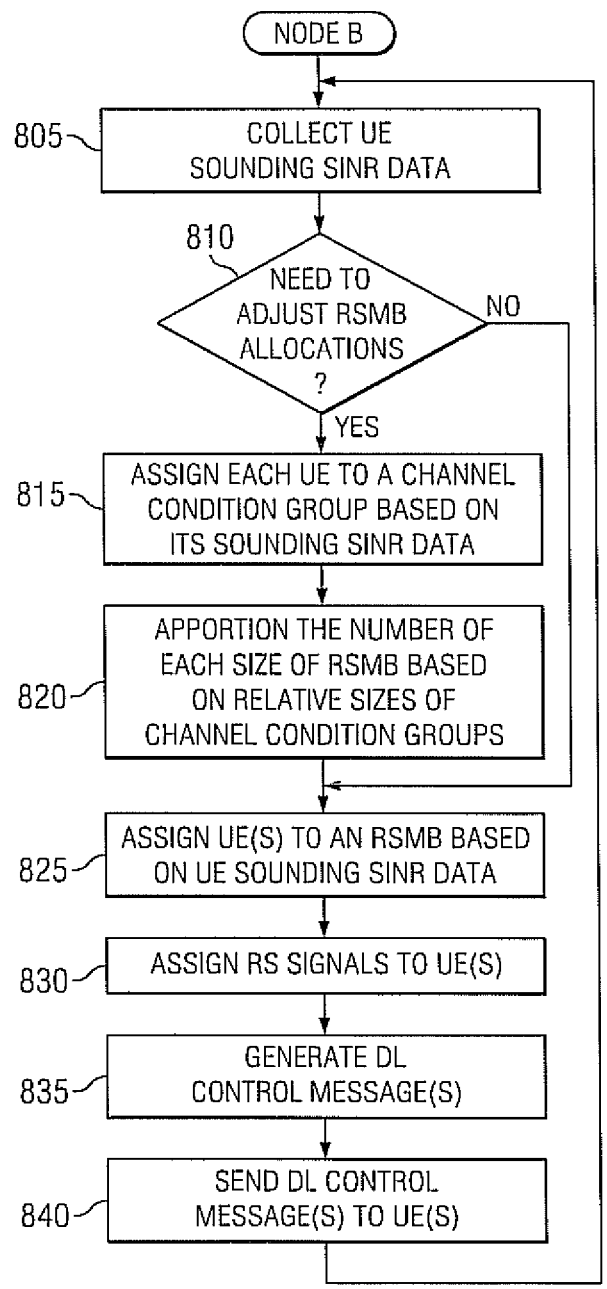
FIG. 8 is a flowchart representative of example machine accessible instructions that may be carried out to implement any or all of the example resource assignors of FIGS. 1 and 7.

FIG. 8 is a flowchart representative of example machine accessible instructions that may be executed to implement any or all of the example Node Bs 110 and/or the example resource assigners 120 of FIGS. 1 and/or 7. Any or all of example machine accessible instructions of FIG. 8 may be executed by a processor, a controller and/or any other suitable processing device. For instance, the example machine accessible instructions of FIG. 8 may be embodied in coded instructions stored on a tangible medium such as a flash memory, read-only memory (ROM) and/or random-access memory (RAM) associated with a processor (e.g., the example processor 905 discussed below in connection with FIG. 9). Alternatively, some or all of the example flowchart of FIG. 8 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example flowchart of FIG. 8 may be implemented manually or as any combination(s) of any of the foregoing techniques, for example, any combination of firmware, software, discrete logic and/or hardware. Further, although the example machine accessible instructions of FIG. 8 are described with reference to the flowchart of FIG. 8, persons of ordinary skill in the art will readily appreciate that many other methods of implementing the example Node Bs 110 and/or the resource assigners 120 disclosed herein may be employed. For example, the order of execution of one or more of the blocks may be changed, and/or some of the blocks described may be changed, eliminated, sub-divided, and/or combined. Additionally, persons of ordinary skill in the art will appreciate that the example machine accessible instructions of FIG. 8 may be carried out sequentially and/or carried out in parallel by, for example, separate processing threads, processors, devices, discrete logic, circuits, etc.

The example machine accessible instructions of FIG. 8 begin with a Node B (e.g., the example SINR calculator 710 of FIG. 7) measuring and/or collecting SINR data for its associated UE devices (block 805). If the collected and/or updated SINR data does not warrant a RSMB reallocation (block 810), control proceeds to block 825 without assigning UE devices to channel condition groups. If the Node B (e.g., the RSMB allocator 715) determines that the collected and/or updated SINR data warrants a reallocation of RSMBs (block 810), the RSMB allocator assigns each UE to a channel condition group based on its associated SINR value (block 815). The RSMB allocator then selects the number of each bandwidth RSMB based on the relative sizes of the channel condition groups (block 820).

The Node B (e.g., the example UE allocator 720 of FIG. 7) assigns each UE to a RSMB and for each sounding reference signal transmission interval determines whether each UE is to transmit an SRS (block 825). If a UE is to transmit an SRS, the UE allocator also determines which SRS is to be transmitted and in which transmission interval (symbol) of the uplink sub-frame and in which RSMB(s) (block 830).

The Node B (e.g., the example DL control message generator 725 of FIG. 7) generates downlink control signaling to convey the SRS, RSMB and SRS transmission interval assignments to the UE devices (block 835). A transmit module 730 sends the downlink control signaling to the UE devices (block 840). Control then returns to block 805 to collect and/or update uplink SINR data.

Figure 9:
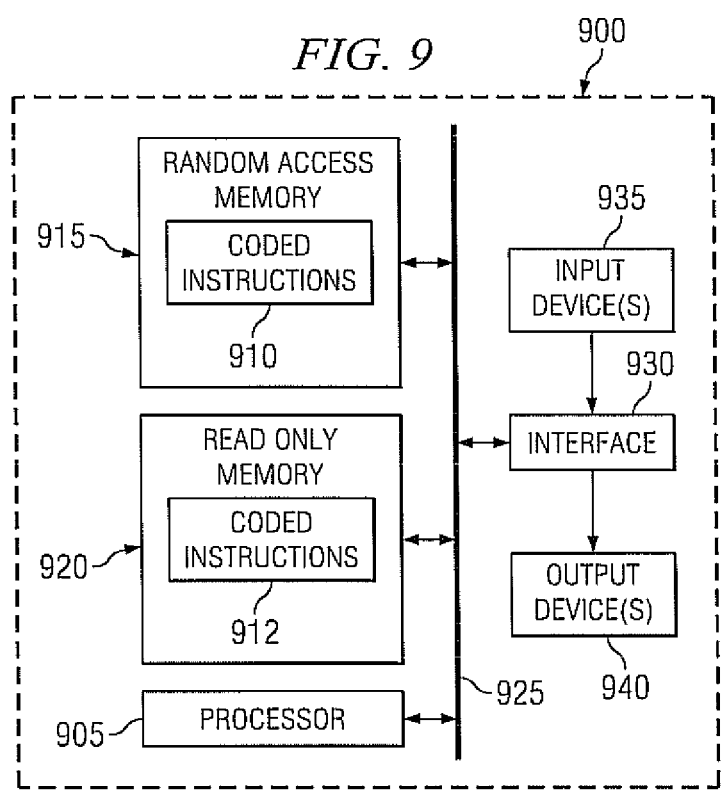
FIG. 9 is a schematic illustration of an example processor platform that may be used and/or programmed to execute the example machine accessible instructions of FIG. 8 to implement the example methods and apparatus to schedule uplink transmissions described herein.

FIG. 9 is a schematic diagram of an example processor platform 900 that may be used and/or programmed to implement any portion(s) and/or all of the example resource assigners 120 and/or the example Node Bs 110 and/or the example mapper controllers 125 of FIGS. 1, 4 and/or 7. For example, the processor platform 900 can be implemented by one or more processors, processor cores, microcontrollers, DSPs, DSP cores, ARM processors, ARM cores, etc.

The processor platform 900 of the example of FIG. 9 includes at least one programmable processor 905. The processor 905 executes coded instructions 910 and/or 912 present in main memory of the processor 905 (e.g., within a RAM 915 and/or a ROM 920). The processor 905 may be any type of processing unit, such as a processor core, a processor and/or a microcontroller. The processor 905 may execute, among other things, the example machine accessible instructions of FIG. 8 to implement any or all of the example Node Bs 110 and/or the example resource assigners 120 described herein. The processor 905 is in communication with the main memory (including a ROM 920 and/or the RAM 915) via a bus 925. The RAM 915 may be implemented by DRAM, SDRAM, and/or any other type of RAM device, and ROM may be implemented by flash memory and/or any other desired type of memory device. Access to the memory 915 and 920 may be controlled by a memory controller (not shown).

The processor platform 900 also includes an interface circuit 930. The interface circuit 930 may be implemented by any type of interface standard, such as a USB interface, a Bluetooth interface, an external memory interface, serial port, general purpose input/output, etc. One or more input devices 935 and one or more output devices 940 are connected to the interface circuit 930. The input devices 935 and/or output devices 940 may be used to transmit downlink control signaling and/or to receive uplink SRSs.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    measuring channel conditions for a plurality of user equipment devices at a base transceiver station of a wireless communication system;
    dividing an operating bandwidth of the base transceiver station into two or more non-overlapping portions, wherein the operating bandwidth is divided based on the channel conditions; and instructing a first of the plurality of user equipment devices to transmit a sounding reference signal in a first non-overlapping portion during a sounding reference signal transmission interval.

2. A method as defined in claim 1, wherein the channel conditions comprise signal-to-interference and noise (SINK) values.

3. A method comprising:
measuring channel conditions for a plurality of user equipment devices at a base transceiver station of a wireless communication system;
dividing an operating bandwidth of the base transceiver station into two or more non-overlapping portions;
instructing a first of the plurality of user equipment devices to transmit a sounding reference signal in a first non-overlapping portion during a sounding reference signal transmission interval; and
performing at least one of frequency-domain channel-dependent scheduling or time-domain channel-dependent scheduling for a first subset of the plurality of user equipment devices within the first non-overlapping portion.

4. A method comprising:
measuring channel conditions for a plurality of user equipment devices at a base transceiver station of a wireless communication system;
dividing an operating bandwidth of the base transceiver station into two or more non-overlapping portions;
instructing a first of the plurality of user equipment devices to transmit a sounding reference signal in a first non-overlapping portion during a sounding reference signal transmission interval;
performing at least one of frequency-domain channel-dependent scheduling or time-domain channel-dependent scheduling for a first subset of the plurality of user equipment devices within the first non-overlapping portion; and
performing at least one of frequency-domain channel-dependent scheduling or time-domain channel-dependent scheduling for a second subset of the plurality of user equipment devices within a second non-overlapping portion.

5. A method comprising:
measuring channel conditions for a plurality of user equipment devices at a base transceiver station of a wireless communication system;
dividing an operating bandwidth of the base transceiver station into two or more non-overlapping portions;
instructing a first of the plurality of user equipment devices to transmit a sounding reference signal in a first non-overlapping portion during a sounding reference signal transmission interval; and
scheduling a data signal transmission for a first of the plurality of user equipment devices based on a corresponding sounding reference signal.

6. A method as defined in claim 5, wherein the data signal transmission is to occur in the first non-overlapping portion.

7. A method comprising:
measuring channel conditions for a plurality of user equipment devices at a base transceiver station of a wireless communication system;
dividing an operating bandwidth of the base transceiver station into two or more non-overlapping portions;
instructing a first of the plurality of user equipment devices to transmit a sounding reference signal in a first non-overlapping portion during a sounding reference signal transmission interval;
scheduling a data signal transmission for a first of the plurality of user equipment devices based on a corresponding sounding reference signal; and
scheduling a second data signal transmission for a second of the plurality of user equipment devices based on a second corresponding sounding reference signal.

8. A method as defined in claim 7, wherein the second data signal transmission is to occur in a second non-overlapping portion.

9. A method comprising:
measuring channel conditions for a plurality of user equipment devices at a base transceiver station of a wireless communication system;
dividing an operating bandwidth of the base transceiver station into two or more non-overlapping portions;
instructing a first of the plurality of user equipment devices to transmit a sounding reference signal in a first non-overlapping portion during a sounding reference signal transmission interval; and
assigning a first subset of the plurality of user equipment devices to the first non-overlapping portion based on the channel conditions measured at the base transceiver station.

10. A method comprising:
measuring channel conditions for a plurality of user equipment devices at a base transceiver station of a wireless communication system;
dividing an operating bandwidth of the base transceiver station into two or more non-overlapping portions, wherein dividing the operating bandwidth of the base transceiver station into the two or more non-overlapping portions comprises:
assigning each UE to a channel condition group based on its associated channel condition; and
determining a number of each size of the non-overlapping portions based on relative sizes of channel condition groups; and
instructing a first of the plurality of user equipment devices to transmit a sounding reference signal in a first non-overlapping portion during a sounding reference signal transmission interval.

11. A base transceiver station apparatus comprising:
a signal-to-interference and noise ratio (SINK) calculator to measure channel conditions for a plurality of user equipment devices of a wireless communication system;
a reference signal multiplexing block (RSMB) allocator to divide an operating bandwidth of the wireless communication system into two or more non-overlapping portions based on the measured channel conditions; and
a user equipment (UE) allocator to instruct a first of the plurality of user equipment devices to transmit a sounding reference signal in a first one of the non-overlapping portions during a sounding reference signal transmission interval; and
a scheduler to perform at least one of frequency-domain channel-dependent scheduling or time-domain channel-dependent scheduling of a data signal transmission for the first of the plurality of user equipment devices within the first non-overlapping portion.

12. An apparatus as defined in claim 11, wherein the UE allocator is to assign a second of the plurality of user equipment devices to a second non-overlapping portion based on the measured channel conditions.

13. A base transceiver station apparatus comprising:
a signal-to-interference and noise ratio (SINR) calculator to measure channel conditions for a plurality of user equipment devices of a wireless communication system;

a reference signal multiplexing block (RSMB) allocator to divide an operating bandwidth of the wireless communication system into two or more non-overlapping portions based on the measured channel conditions; and a user equipment (UE) allocator to instruct a first of the plurality of user equipment devices to transmit a sounding reference signal in a first one of the non-overlapping portions during a sounding reference signal transmission interval, wherein the UE allocator is to instruct a second of the plurality of user equipment devices to transmit a second sounding reference signal in the first non-overlapping portion during a sounding reference signal transmission interval.

14. An article of manufacture storing machine accessible instructions which, when executed, cause a machine to:

measure channel conditions for a plurality of equipment devices at a base transceiver station of a wireless communication system;

divide an operating bandwidth of the base transceiver station into at least two non-overlapping portions based on the measured channel conditions;

instruct a first of the plurality of user equipment devices to transmit a sounding reference signal in a first non-overlapping portion during a sounding reference signal transmission interval; and perform at least one of frequency-domain channel-dependent scheduling or time-domain channel-dependent scheduling for a second subset of the plurality of user equipment devices within a second non-overlapping portion.

15. An article of manufacture storing machine accessible instructions which, when executed, cause a machine to:

measure channel conditions for a plurality of equipment devices at a base transceiver station of a wireless communication system;

divide an operating bandwidth of the base transceiver station into at least two non-overlapping portions based on the measured channel conditions;

instruct a first of the plurality of user equipment devices to transmit a sounding reference signal in a first non-overlapping portion during a sounding reference signal transmission interval; and instructions, when executed, cause the machine to schedule a data signal transmission for the first of the plurality of user equipment devices based on the sounding reference signal.

* * * * *